July 28, 1959
G. GELLMAN
2,896,737
EXTENSION LOUD SPEAKER
Filed Aug. 25, 1958
2 Sheets-Sheet 1
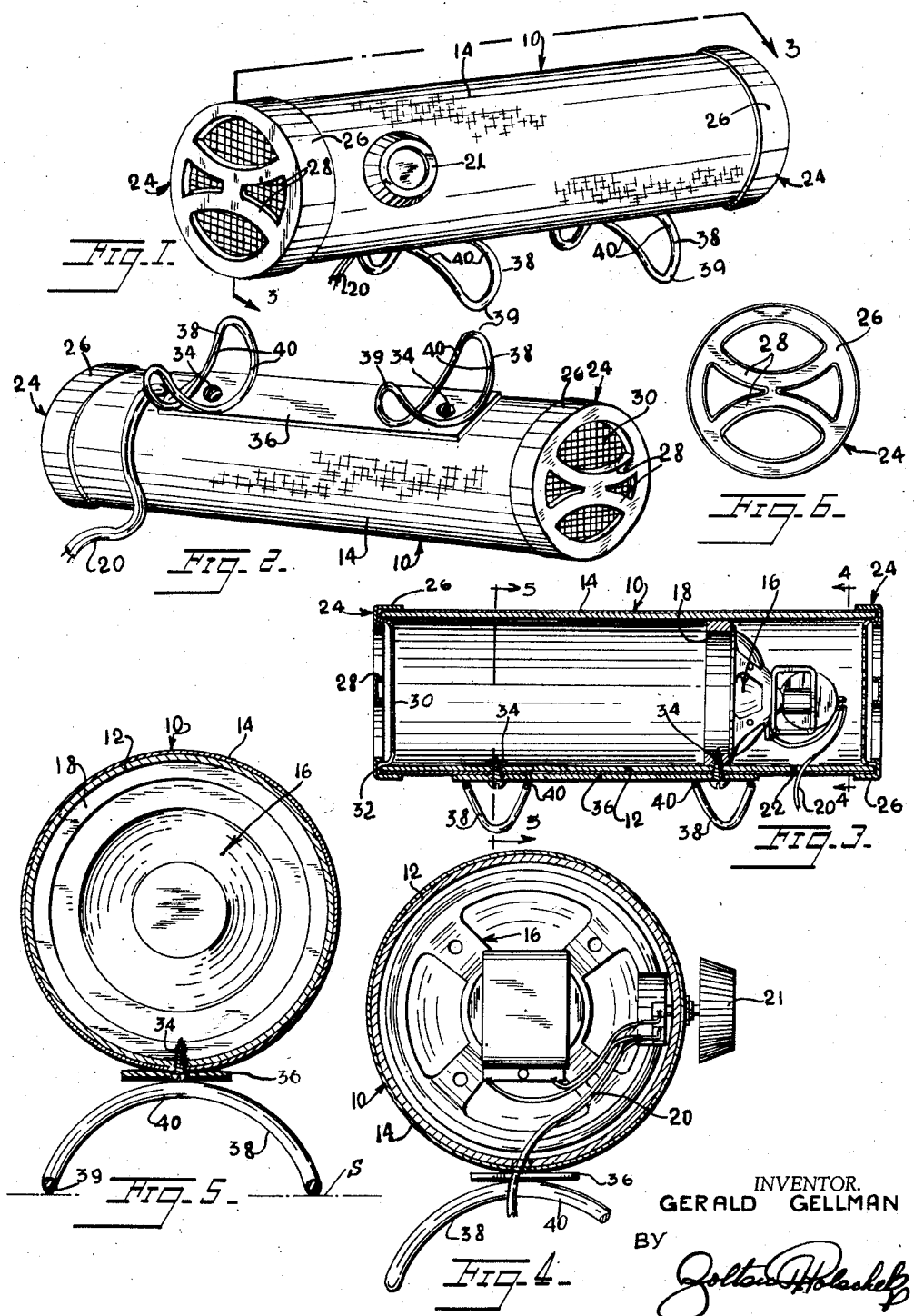
INVENTOR.
GERALD GELLMAN
BY
ATTORNEY

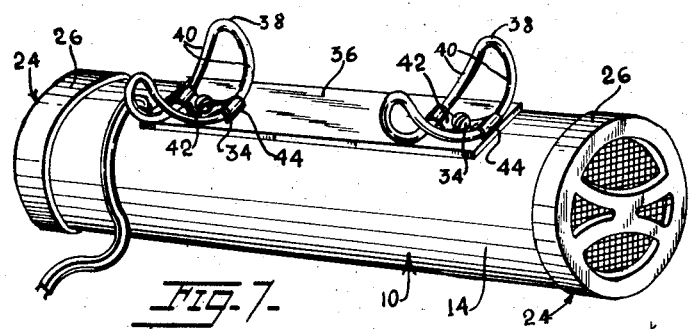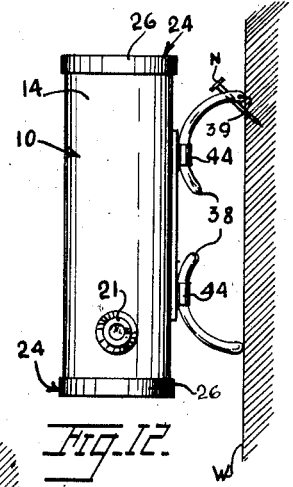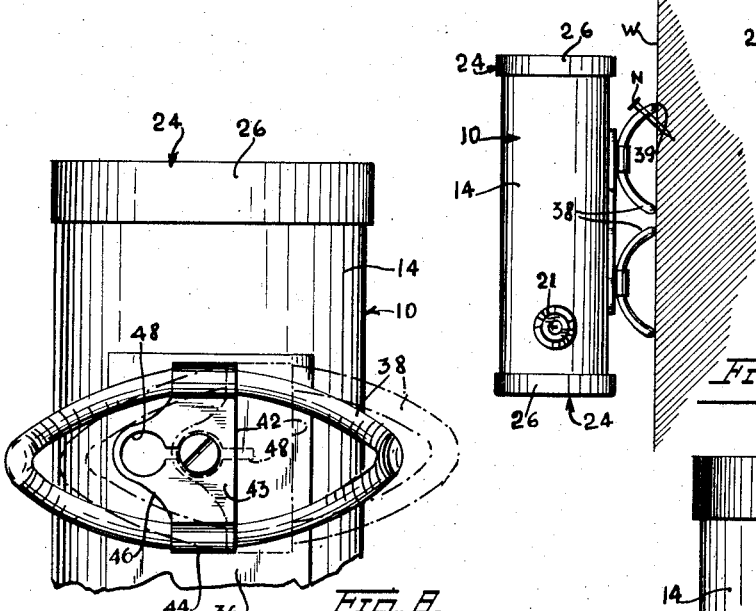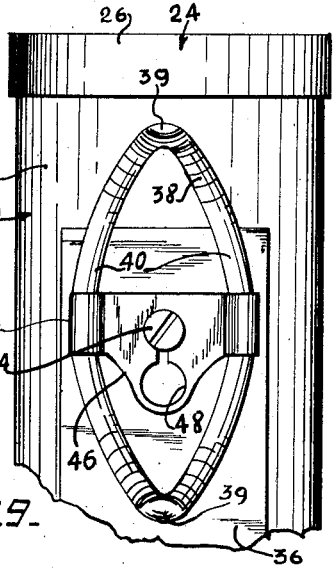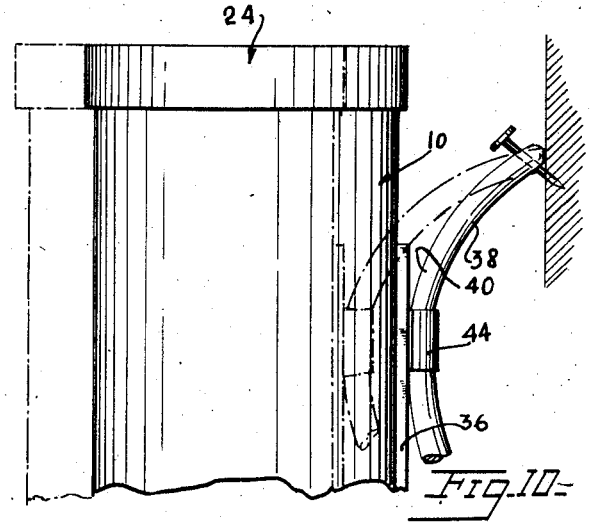

United States Patent Office 2,896,737
Patented July 28, 1959

2,896,737

EXTENSION LOUD SPEAKER

Gerald Gellman, Brooklyn, N.Y., assignor to Orbit Industries, Inc., Brooklyn, N.Y., a corporation of New York Application August 25, 1958, Serial No. 756,807

3 Claims. (Cl. 181—31)

This invention relates to a portable loud-speaker assembly for radio and television receivers, phonographs, etc. More particularly, the invention has reference to a device of this nature that is especially designed to combine attractiveness of shape with a particularly high efficiency resulting from said shape.

One object of importance is to provide an elongated, tube-like speaker, the shape of which will produce particularly faithful reproduction of sounds.

A second object is to so form the assembly as to permit incorporation of a conventional cone-type speaker therein, thus keeping manufacturing costs at a minimum.

A further object is to provide support means for the tubular housing of the speaker, which means will be designed for suspension of the assembly from a room wall, or alternatively, will allow the assembly to rest directly upon a horizontal supporting surface.

Yet another object is to permit, in one form of the device, the adjustment of the same laterally outwardly from the room wall, whenever it is suspended vertically from the wall.

A further object is to facilitate the assembly of the device from relatively inexpensive components.

Still another object is to effect the connection of the cone speaker to the housing by the same means that is used to mount support legs on the housing.

Another object is to have, in one form of the device, an inexpensive type of connection of support legs to a tubular speaker housing, which connection will at the same time allow adjustment of the support legs on the housing.

A further object is to provide novelly shaped support legs on the device, that will be particularly designed for support of the device either on a horizontal surface or from a vertical wall surface.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of an extension-type portable loud-speaker assembly according to the present invention as it appears when resting upon a horizontal surface.

Fig. 2 is an inverted perspective view of the assembly showing the underside thereof, and showing the position of the assembly if it were suspended from an overhead support such as the underside of a shelf, etc.

Fig. 3 is a longitudinal sectional view through the device, portions being broken away, substantially on line 3—3 of Fig. 1.

Fig. 4 is an enlarged transverse sectional view through the device, taken on line 4—4 of Fig. 3, a portion of one of the support legs being broken away.

Fig. 5 is an enlarged sectional view substantially on line 5—5 of Fig. 3.

Fig. 6 is an elevational view of one of the end closures as seen from inside the housing.

Fig. 7 is a view like Fig. 2 showing a slightly modified construction.

Fig. 8 is an enlarged, fragmentary elevational view of the modified form shown in Fig. 7, showing one of the legs in normal position in full lines and in a second position in dotted lines, said leg being removable bodily from the device when in its dotted line position.

Fig. 9 is a view like Fig. 8, showing yet another position of the leg of the device shown in Fig. 7.

Fig. 10 is an enlarged, fragmentary side elevational view of the modified construction shown in Fig. 7, said device being shown in different positions of adjustment in full and dotted lines respectively.

Fig. 11 is a reduced side elevational view of the device shown in Fig. 7, in a normal position, said normal position comprising the full line position shown in Fig. 10.

Fig. 12 is a view like Fig. 11 in which a device has been adjusted outwardly from an adjacent wall, in an adjusted position represented by the dotted lines in Fig. 10.

Referring to the drawings in detail, in the form of the invention shown in Figs. 1–6, the portable loud-speaker comprising the present invention includes an elongated, constant-diameter, cylindrically shaped housing generally designated 10, said housing being of circular cross section when viewed at any location along its length (see Figs. 4 and 5). The housing 10, as shown to perhaps best advantage in Fig. 3, comprises an elongated, open-ended tube 12 which may be of thin sheet metal or similar material, said tube being covered over the full area of its outer surface by a fabric ornamental covering 14. Within the tube, there is fixedly mounted a conventional speaker generally designated 16, secured to a mounting ring 18. The details of the speaker will not be described herein. Said speaker is completely conventional in and of itself, and is of a type widely used in television and radio receivers, etc.

The speaker has the usual lead-in cable 20, and as shown in Figs. 1 and 4, associated with the speaker 16 is a switch 21 including an exteriorly disposed rotary knob. The switch is employed for turning the speaker on or off, as desired, and is in series circuit with the speaker.

The lead-in cable or conductor extends through registering openings 22 formed in the tube 12 and covering 14 adjacent one end of the tube.

The housing further includes closures for the opposite ends thereof, and these closures are of the freely perforated type, to permit the sound to emanate from the tube. The closures 24 at the opposite ends of the housing include peripherally channeled end plates 26, having channeled, oppositely bowed, integrally connected cross members 28. In Fig. 6, one of the end closures 24 is shown per se, as it would appear when seen from within the housing.

The peripherally extending channeled portion of the closure 24 embraces the adjacent end of the tube as shown in Fig. 3. In this connection, each closure 24 further includes a cloth screen 30, the peripheral portion 32 of which is engaged against the end of the tube by the channeled marginal part of the end plate 26.

As will be seen, the end closure is designed to provide a high degree of efficiency so far as reception is concerned, and said end closure is designed to direct sound efficiently, and may appropriately be considered as a front horn type baffle for a speaker of the cone type illustrated in the drawing. There is also provided a rear loading of the horn, since the speaker has an enclosed space to the rear thereof.

Spaced longitudinally of the tube 12 are screws 34 threadedly engaged in the tube and securing to the wall of the tube an elongated, flat plate 36. Identical, transversely extending, longitudinally spaced, loop-like legs 38 are welded or otherwise fixedly secured to the end portions of the plate 36. Each leg 38 is bowed upwardly, as shown in Fig. 5, with the ends 39 of each leg being adapted to rest upon a supporting surface S. The bowed side portions 40 of the respective legs extend transversely of the plate 36 in contact therewith, and can be spot-welded or otherwise fixedly secured to the plate.

The legs are adapted to support the device horizontally upon the surface S as shown in Fig. 5. However, one could suspend the device from an overhead support, such as the underside of a shelf, in which event the device would appear as in Fig. 2. At this time, the leg ends 39 would receive fastening elements, designed to maintain said ends 39 connected to the overhead supporting surface.

Reference should now be had to Figs. 7–12. In this form of the invention, the construction is identical in all respects to that of Figs. 1–6, except that the legs 38 are not permanently, fixedly secured to the plate 36. Instead, the legs are adjustably connected to the plate and can even be individually or conjointly removed entirely from the plate 36. A further difference resides in the fact that the connection of the legs to the plate 36 comprises clamping plates 42.

Referring to Figs. 8 and 9, each clamping plate 42 has a flat body part 43, at opposite sides of which there are formed partly cylindrical clamping portions 44 that straddle the side portions 40 of the leg 38. Centrally formed in the body portion 43 of each clamping plate 42 is a transversely extending keyhole slot 48, formed in a lateral projection 46 of the body portion of the plate. The keyhole slot has a large end and a smaller end, and the smaller end is adapted to receive a shank of the screw 34. The larger end is greater than the head of the screw. Therefore, with the screw slightly loosened, the plate can initially be in the dotted line position shown in Fig. 8. In this position, the large end of the slot 48 fits over the head of the screw. Then, the plate is shifted laterally from the dotted line to the full line position of Fig. 8. This locates the screw at the smaller end of the keyhole slot 48. The screw 34 is now tightened, and the legs 38 are thus connected to the mounting plate 36. One of the screws 34, it may be noted, at this point, in both forms of the invention extends into the mounting ring (see Fig. 3) to secure the mounting ring in place in the tube 12.

It is to be noted that when the loud-speaker is to be supported on a horizontal surface in the manner shown in Fig. 1, the plates and legs would be as in full lines in Fig. 8. The legs would thus be located identically to those in the first form of the invention. However, if one were to desire to suspend the loud-speaker vertically from a wall W in the manner shown in Figs. 11 and 12, the legs 38 would be turned ninety degrees to the Fig. 9 position thereof. One does this by merely loosening the screw 34 while leaving the seam at the small end of the slot 48. After the plate 42 is turned to the Fig. 9 position, the screw 34 is again tightened. Now, the upper end 39 can receive or be positioned over the nail N or equivalent fastening means, designed to suspend the loudspeaker from the wall W. Said nail, in other words, can engage under the upper portion 39 of the upper one of the legs 38 in Fig. 11. The lower end 39 cooperates with the upper end, in supporting the housing outwardly from the wall, in its assigned vertical position, that is, the lower end 39 is in contact with the wall.

If one were to desire to judge the distance between the speaker and wall, so as to make said distance greater than it is in Fig. 11, one need merely loosen the screw 34, and shift the leg 38 longitudinally within the clamping portion 44. In other words, the clamping portions would now be disposed nearer one end of the leg 38 than they are to the other end, instead of at the medially disposed location shown in Fig. 9.

The legs would now be in the dotted line position shown in Fig. 10, that is, the position shown in Fig. 12. The legs can be oppositely arranged when adjusted in this way as shown in Fig. 12. It will be seen that this spaces the loud-speaker assembly a greater distance from the wall, so that one can adjust the distance according to the needs of the particular situation. Further, there is less tendency toward reverberation. Reception, in other words, may be found to be improved by locating the speaker outwardly from the wall a particular, adjusted distance.

In all forms of the invention, the device is characterized by the attractive appearance thereof, and by its ready portability. Of course, the speaker would be connected to a conventional radio or television receiver, and can comprise the only speaker for said receiver. Alternatively, it can comprise an auxiliary speaker to be switched on or off as desired. The speaker may even, in this connection, be one of a plurality of speakers, located perhaps in different rooms of a house, so that one can switch on a speaker in any room, as desired.

The device is further characterized by the considerable versatility with respect to the manner of supporting the device upon or from an adjacent surface. This is shown clearly in Figs. 1, 2, 11 and 12, showing a number of different positions which a single speaker may have when so supported.

When I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A portable loud-speaker assembly comprising a tubular casing, end closures thereon, support means on the casing, and a speaker within the casing, said casing being of elongated form, and being of a constant diameter from end to end thereof, the support means being spaced longitudinally of the casing, and including loop-like support legs, said legs being of elongated form, said support legs being arcuately bowed, the portions of the legs midway the ends thereof extending adjacent the wall of the casing, the support means further including a mounting plate extending longitudinally of and secured to the casing, said portions of the legs midway the ends thereof having a connection to the mounting plate, the connection of the legs to the mounting plate comprising clamp plates mounted on the mounting plate and overlying the support legs, the clamp plates being rotatably adjustable on the mounting plate for correspondingly rotatably adjusting the support legs.

2. A portable loud-speaker assembly comprising a tubular casing, end closures thereon, support means on the casing, and a speaker within the casing, said casing being of elongated form, and being of a constant diameter from end to end thereof, the support means being spaced longitudinally of the casing and including loop-like support legs, said legs being of elongated form, said support legs being arcuately bowed, the portions of the legs midway the ends thereof extending adjacent the wall of the casing, the support means further including a mounting plate extending longitudinally of and secured to the casing, said portions of the legs midway the ends thereof having a connection to the mounting plate, the connection of the legs to the mounting plate comprising clamp plates mounted on the mounting plate and overlying the support legs, the clamp plates being rotatably adjustable on the mounting plate for correspondingly rotatably adjusting the support legs, the rotatable adjustment of the clamp plates being about an axis perpendicularly intersecting the longitudinal median line of the casing.

3. A portable loud-speaker assembly comprising a tubular casing, end closures thereon, support means on the casing, and a speaker within the casing, said casing being of elongated form, and being of a constant diameter from end to end thereof, the support means being spaced longitudinally of the casing, and including looplike support legs, said legs being of elongated form, said support legs being arcuately bowed, the portions of the legs midway the ends thereof extending adjacent the wall of the casing, the support means further including a mounting plate extending longitudinally of and secured to the casing, said portions of the legs midway the ends thereof having a connection to the mounting plate, the connection of the legs to the mounting plate comprising clamp plates mounted on the mounting plate and overlying the support legs, the clamp plates being rotatably adjustable on the mounting plate for correspondingly rotatably adjusting the support legs, the rotatable adjustment of the clamp plates being about an axis perpendicularly intersecting the longitudinal median line of the casing, the support legs being longitudinally adjustable within the clamp plates, in curved path following the curvature of the legs, in each position to which the clamp plates are rotatably adjusted.

References Cited in the file of this patent

UNITED STATES PATENTS

| | | |
|---|---|---|
| D. 172,594 | Guichard | July 13, 1954 |
| D. 176,183 | Goldman et al. | Nov. 29, 1955 |
| 1,738,955 | Jordan et al. | Dec. 10, 1929 |
| 1,908,513 | Holst | May 9, 1933 |
| 2,002,390 | Crosley et al. | May 21, 1935 |
| 2,724,571 | Friedman et al. | Nov. 22, 1955 |
| 2,794,695 | Heal | June 4, 1957 |
| 2,815,801 | Fingerhut et al. | Dec. 10, 1957 |

FOREIGN PATENTS

| | | |
|---|---|---|
| 856,899 | Germany | Nov. 24, 1952 |